PHONOGRAPH RECORD PLAYER ASSEMBLY

Filed March 20, 1967

WITNESSES:
Bernard R. Giegue
James F. Young

INVENTOR
John L. Benty
BY [signature]
ATTORNEY

PHONOGRAPH RECORD PLAYER ASSEMBLY

Filed March 20, 1967

United States Patent Office 3,460,839

Patented Aug. 12, 1969

3,460,839

PHONOGRAPH RECORD PLAYER ASSEMBLY

John L. Benty, Scotch Plains, N.J., assignor to Westinghouse Electric Corporation, Pittsburgh, Pa., a corporation of Pennsylvania Filed Mar. 20, 1967, Ser. No. 624,405
Int. Cl. G11b *1/02, 1/00, 3/02*
U.S. Cl. 274—2 7 Claims

ABSTRACT OF THE DISCLOSURE

A portable phonograph record player assembly in which a record player is disposed within a pair of speaker enclosures which act as a cabinet for storing and carrying the record player and are detachable therefrom when the record player is to be operated. The speaker enclosures are provided with doors which swing close when the enclosures are removed from the record player to enclose the speakers disposed therein and swing open to permit the record player to be inserted into the speaker enclosures for storage or carrying.

DESCRIPTION OF THE INVENTION

The present invention relates to phonograph record player assemblies and, more particularly, to portable phonograph record player assemblies wherein the speaker enclosures thereof are detachable.

Various schemes have been utilized in portable phonograph record players to attach the speaker enclosure or enclosures to make the unit transportable while still permitting the speaker enclosures to be detached from the record player itself when operating the record player. It is especially desirable that the speaker enclosures be detachable for stereophonic operation of the record player. It is also highly desirable that the speaker enclosures be relatively large for high quality of sound reproduction within the mandate of portability for the assembly. A common technique of attaching the speaker enclosures to the record player is to latch the enclosures to the side, front, or back of the record player and to use a separate cabinet for the record player itself. Another method commonly used is to hinge the speaker enclosures to the sides of the record player cabinet. An obvious disadvantage of the just-described structures is the requirement that a separate case or other closure be provided for the record player in addition to the attachment of the speaker enclosures thereto. Moreover, the attachment of the relatively large speaker enclosures to the outside of the record player cabinet increases the size of the overall assembly thus limiting its portability.

Therefore, it appears attractive to use the speaker enclosures themselves as the cabient for the record player when it is arranged for carrying or storage. The relatively large space within the speaker enclosures provides an ideal area for the disposition of the record player. However, for acoustical reasons it becomes desirable that the speaker enclosure be completely closed to confine the speakers therein when the enclosures are removed from the record player assembly during operation of the record player.

It is therefore an object of the present invention to provide a new and improved portable phonograph record player assembly.

It is a further object to provide a portable phonograph record player assembly wherein the speaker enclosures thereof are utilized as the cabinet for the record player.

It is a further object to provide a portable phonograph record player assembly wherein the speaker enclosures thereof are utilized as the cabinet for the record player when it is in its stored position and wherein the speaker enclosures may be separated from the record player and completely enclosed for high quality sound reproduction.

Broadly the above cited objects are accomplished by providing a portable phonograph record player assembly in which a record player is disposed within a pair of speaker enclosures. The speaker enclosures are provided with doors which are movable to permit access therein for receiving the record player when the record player is in its stored position. When the pair of speaker enclosures are removed from about the record player, the doors are positioned to close the speaker enclosures and complete the enclosure for the speakers therein when the record player is in its operation position.

These and other objects and advantages of the present invention will become more apparent when considered in view of the following specification and drawings in which.

Figure 1:
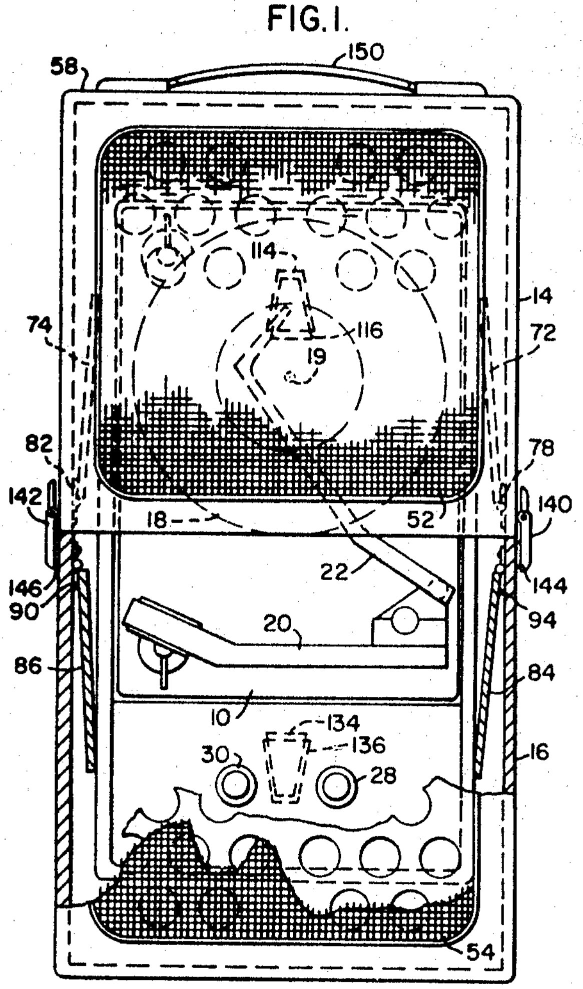
FIGURE 1 is a front view in partial section of the record player assembly in its assembled carrying position.
Figure 2:
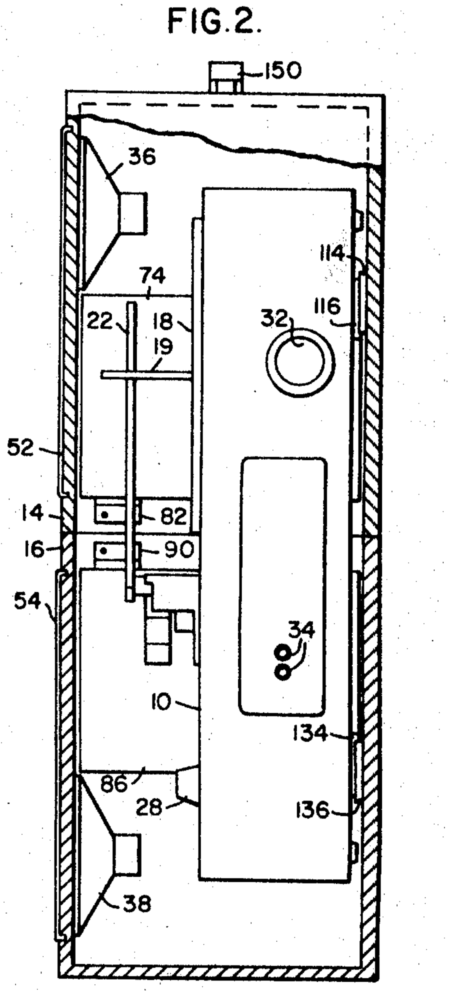
FIG. 2 is a side view of the assembly of FIG. 1 in partial section.

Referring now to FIGURES 1 and 2, the phonograph player assembly is shown in its assembled carrying position and includes as its three major components: a record player 10, which is mounted on a base 12; a top speaker enclosure 14 and a bottom speaker enclosure 16. The record player 10 may be seen better in FIGS. 3 and 4 and may be of the standard automatic changer variety and includes: a spindle *1a*, a turntable 18, a tone arm 20, a stacking arm 22, a speed select mechanism 24 and a reject mechanism 26, all of which are well known in the art. Disposed within the base 12 are the electronics for the record player which comprises the necessary audio amplifying circuitry. An on-off volume control knob 28 and a one control knob 30 are indicated for the control of the sound output of the record player assembly. An aperture 32 is provided from which an electrical outlet cord, not shown, may be stored within the base 12 and may be withdrawn to provide the operating power for the record player. A pair of speaker jacks 34 are provided in base 12 into which the respective speaker cables are inserted, with the other ends thereof connected to the respective speakers of the assembly when the record player is in its operating position.

Figure 5:
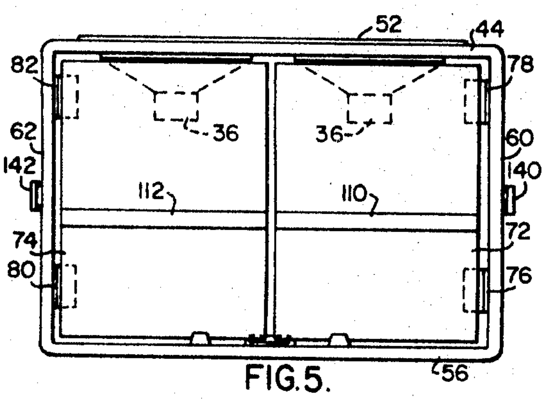
FIG. 5 is a view of a speaker enclosure taken along the line V—V of FIG. 3.
Figure 3:
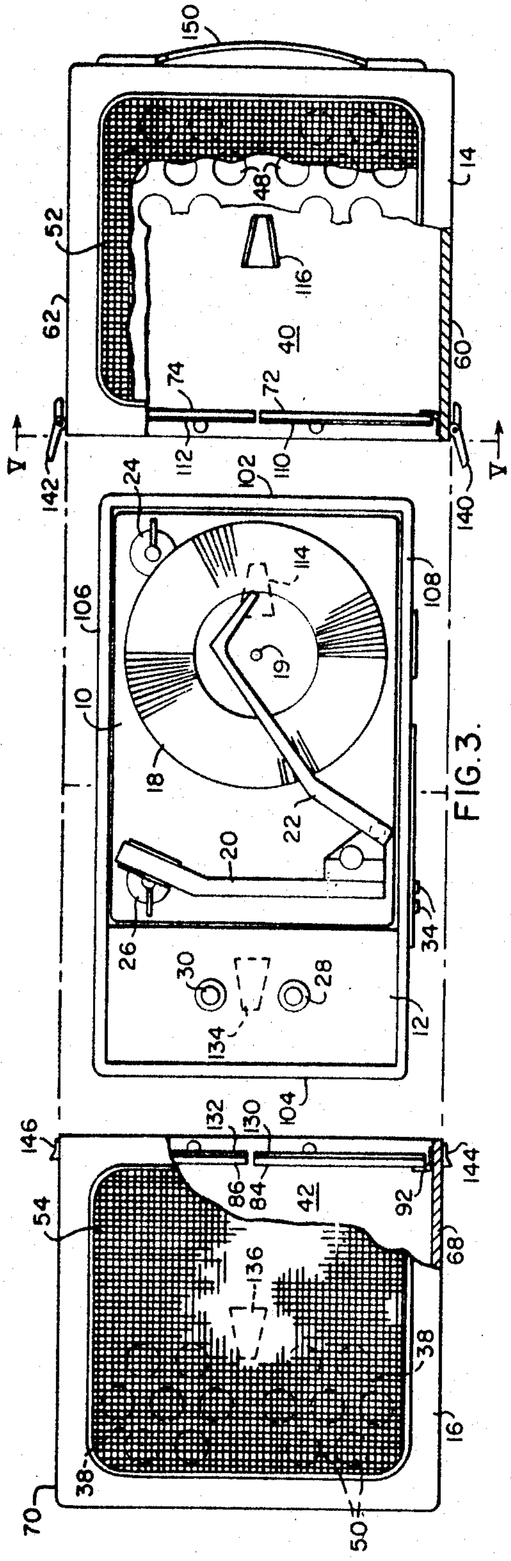
FIG. 3 is a top view of the record player assembly with the speaker enclosures removed from the record player and the enclosures in partial section.
Figure 4:
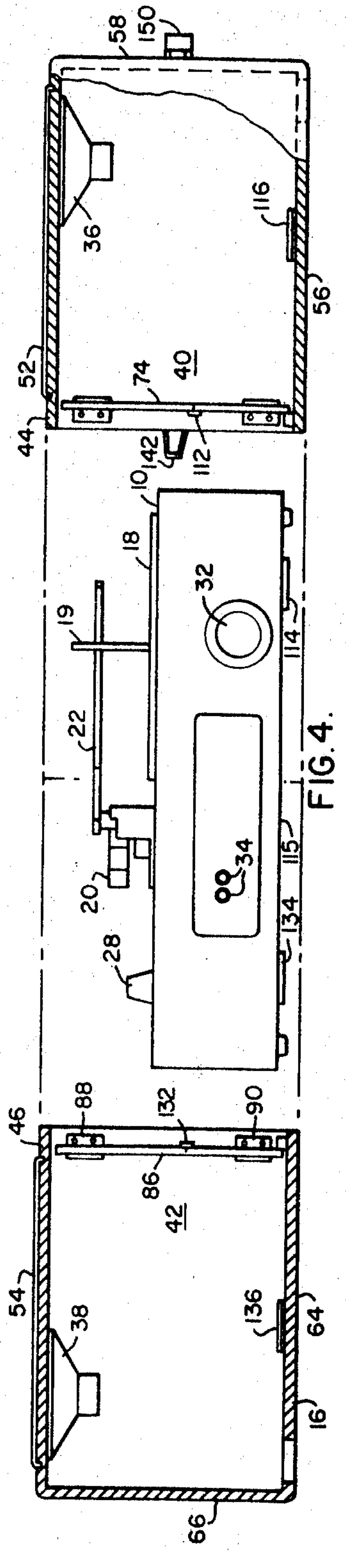
FIG. 4 is a side view of FIG. 3 with the speaker enclosures in partial section.

In FIGURES 3 and 4, the speaker enclosures 14 and 16 are shown separated from the record player 10 and are shown to include a pair of speakers 36 and 38, respectively. FIGURE 5 better shows the disposition of the speakers 36 of the speaker enclosure 14. The enclosures 14 and 16 are substantially in the shape of a rectangular box, with receiving areas 40 and 42 being provided respectively therein. The pair of speakers 36 and 38 are mounted within the receiving areas 40 and 42, respectively, to frontal walls 44 and 46 of each of the speaker enclosures 14 and 16 respectively. A plurality of apertures 48 and 50 are formed respectively in the walls 44 and 46 so that the speakers 36 and 38 disposed therebehind may emit sound therefrom substantially unattenuated but will also be protected from damage by the unremoved structure. A decorative grille cloth 52 is disposed over the wall 44 of the enclosure 14, and a decorative grille cloth 54 is disposed over the wall 46 of the speaker enclosure 16.

As shown in FIGURES 3 and 4 the speaker enclosure 14 is completed by having a bottom wall 56 parallel to the top wall 44, an outside wall 58 between the walls 44 and 56, and side walls 60 and 62 disposed between the walls 44 and 56. The walls 56, 58, 60 and 62 may be of a solid construction. The speaker enclosure 16 is similarly constructed with a bottom wall 64 parallel to the top wall 46, a side wall 66 disposed between the walls 46 and 64 and side walls 68 and 70. The speaker enclosures 14 and 16 are thus enclosed on five sides thereof, taking into account that apertures are provided in the walls 44 and 46 for the speakers 36 and 38, respectively. On the sixth side of each of the speaker enclosures 14 and 16, a pair of doors which are hinged to the enclosure side walls are provided. This is better seen in FIG. 5 for the enclosure 14. As shown therein, a pair of doors 72 and 74 are provided. The door 72 is mounted to the side wall 60 of the enclosure 14 through a pair of hinges 76 and 78. The door 74 is mounted to the side wall 62 by a pair of hinges 80 and 82. The hinges 76, 78, 80 and 82 may be conveniently secured to the side walls 60 and 62 by screws, rivets or other fastening means. The speaker enclosure 16 is similar in construction including a pair of doors 84 and 86 which are mounted to the side walls 68 and 70 by hinges similar to the hinges 76, 78, 80 and 82. In FIG. 4, a pair of hinges 88 and 90 are shown securing the door 86 to the wall 70. FIGS. 3 and 1, respectively, show a pair of hinges 92 and 94 securing the door 84 to the wall 68.

All of the hinges as designated above may be of the spring biased type or at least one of the hinges for each of the doors should be of the spring biased type.

Figure 6:
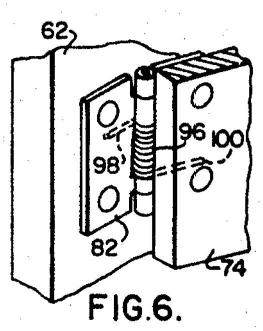
FIG. 6 is a detailed pictorial view of the hinge assembly as used with the speaker enclosures shown herein.

FIG. 6 shows a detailed pictorial drawing of the hinge 82 which is connected between the door 74 of the enclosure 14 and the side wall 62 thereof. This hinge 82 is shown to be of the spring biased type having a spring 96 wound around the axle of the hinge 82. The end 98 of the spring 96 is disposed between the hinge 82 and the wall 62, and the other end 100 of spring 96 is disposed between the hinge 82 and the door 74. The spring 96 thus biases the door 74 in such a direction to tend to close the door as shown in FIG. 5 and also FIGURES 3 and 4. As shown in FIG. 6 the spring is in an open position operating against the biasing force of the spring 96. If the door 74 is released from the position as shown in FIG. 5, it will return to its closed position with the arms of the hinge 82 being held at right angles to each other and the door being disposed in its closed position as shown in FIGS. 3, 4 and 5. Thus, under the spring-biased action of the hinges, the respective doors 72 and 74 of the speaker enclosure 14 and the doors 84 and 86 of the enclosure 16 will be maintained in the closed position when the record player 10 and base 12 are removed from the enclosures as shown in FIGS. 3 and 4.

In order to change the record player assembly from its disassembled condition as shown in FIGS. 3 and 4 to its assembled carrying position as shown in FIGS. 1 and 2, it is necessary to insert the record played 10 and base 12 into the ends of the speaker enclosures 14 and 16 to which the door pairs 72–74 and 84–86 are affixed. The base 12 includes an end wall 102 adjacent the door 72–74 and an end wall 104 adjacent the doors 84–86. By pushing the end wall 102 against the doors 72 and 74 this will force the doors inwardly of the receiving area 40 of the speaker enclosure 14 against the biasing force of the spring hinges 76, 78, 80 and 82. The doors 72 and 74 will be forced inwardly until the continued insertion of the base 12 will cause side walls 106 and 108 thereof to engage the doors 72 and 74. A sliding member 110 is provided in the door 72 and a similar member 112 is provided in the door 74 to act as sliding surfaces for the end walls 106 and 108 of the base 12. The base member 10 will continue its inward movement until a mating slot member 114, disposed on the bottom surface 115 on right side of the base 12, engages a receiving slot member 116, disposed on the inner surface of the wall 56 of the speaker enclosure 14.

Figures 7A, 7B:
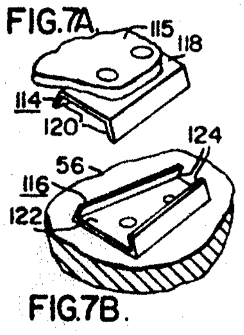
FIGS. 7A and 7B are pictorial views of slot members as utilized to secure the record player and speaker enclosures in the position as shown in FIGS. 1 and 2.

The mating slot member 114 is shown in detail in FIG. 7A, and the receiving slot member 116 is shown in FIG. 7B. The mating slot member 114 is shown in FIG. 7A secured to the bottom wall 115 of the base 12 and is shown to have a flat top portion 118 and a pair of downwardly and outwardly extending flanges 120 thereon. The receiving slot member 116 in FIG. 7B is secured to the wall 56 and has a flat bottom portion 122 and a pair of flange portions extending upwardly and inwardly. The mating slot member 114 thus engages the receiving slot member 116 with the flanges 120 and 124, respectively, thereof engaging so as to secure the base member 12 to the bottom wall 56 of the speaker enclosure 16. This is illustrated in FIG. 1 with the slot members 114 and 116 being shown in the engaged position.

The speaker enclosure 16 is similarly disposed over the base 12 with the end wall 104 thereof engaging the doors 84 and 86 forcing them inwardly against the spring biased pressure of the hinges 88, 90, 92 and 94. Similarly, sliding members 130 and 132 are disposed in the doors 84 and 86, respectively, to act as sliding surfaces when the side walls 106 and 108 of the base 12 engage thereon. The base member 12 is inserted into the receiving area 42 of the speaker enclosure 16 until a mating slot member 134, secured to the bottom wall 115 of the base 12, engages a mating slot member 136, which is secured to the bottom wall 64 of the enclosure 16. The slot members 134 and 136 are identical to the slot members 114 and 116, respectively. The final engagement of the slot members 134 and 136 is better shown in FIG. 1. The engagement of the slot members 134 and 136 thus secures the base 12 to the speaker enclosure 16.

A latching mechanism is provided for securing the speaker enclosures 14 and 16 together. The latching mechanism includes a pair of movable members 140 and 142 secured, respectively, to the walls 60 and 62 of the speaker enclosure 14 and a pair of keeper members 144 and 146 secured, respectively, to the walls 68 and 70 of the speaker enclosure 16. When the record player assembly is in its assembled position as shown in FIGS. 1 and 2, the movable members 140 and 142 grasp the keeper members 140 and 146 and thereby secure the enclosures 14 and 16 together. A loop handle 150 is secured to the speaker enclosure 14 at the outer wall 58 thereof and acts as a handle for carrying the assembly when it is in its assembled position as shown in FIGS. 1 and 2.

As can be seen by FIGS. 1 and 2, the record player 10 and base 12 are held securely within the speaker enclosures 14 and 16 by the slot members 114–116 and 134–136. The hinge mounted doors 72 and 74 are held inwardly of the enclosure 14 by the base 12, as are the doors 84 and 86 of the enclosure 16 by the base 12. The record player assembly as shown in FIGS. 1 and 2 may then be readily moved about without damage to the record player with the enclosures 14 and 16 acting as the cabinet for the assembly as well as the carrying case therefor.

When it is desired to place the record player in its playable position, the assembled record player assembly as shown in FIG. 1 and FIG. 2 is placed in a horizontal position such as shown in FIGS. 3 and 4. The movable latch members 140 and 142 are released, and the speaker enclosures 14 and 16 are removed from above the record player 10 and base 12, with the slot member 114 disengaging from the slot member 116 and the slot member 134 disengaging from the slot member 136. As the speaker enclosure 14 is moved away from the base 12 the doors 72 and 74 under the action of the spring biased hinges begin to close. When the base 12 is completely removed therefrom, the doors 72 and 74 will close as shown in FIGS 3 and 4 to enclose completely the speakers 36. Similarly, when the speaker enclosure 16 is completely removed away from the base 12, the doors 84 and 86 thereof under the action of spring biased hinges will close to completely enclose the speakers 38 therein with the doors in the position as shown in FIGS. 3 and 4. With the speaker enclosures 14 and 16 removed from about the base 12, the record player 10 may be put into operation with connections between the jack inputs 34 being made, respectively, to the speakers of the speaker enclosures 14 and 16. The speaker enclosures 14 and 16 may be placed to achieve a stereophonic effect or as otherwise desired by a listener. It should be noted that both speaker enclosures 14 and 16 are completely enclosed except for the apertures 48 and 50 for the speakers 36 and 38, respectively, and thus give an enhanced sound output as desired from a speaker enclosure. Moreover, the speaker enclosures 14 and 16 are automatically closed under the effect of spring biased hinges as the enclosures are extracted from about the base 12.

Although the present invention has been described with a certain degree of particularity, it should be understood that the present disclosure has been made only by way of example and that numerous changes in the details of construction and the combination and arrangement of parts and components can be resorted to without departing from the spirit and scope of the present invention.

I claim as my invention:

1. A phonograph record player assembly comprising:
a record player;
a base for mounting said record player thereon; and
a pair of speaker enclosures each including a speaker therein and having a record player receiving area therein,
said pair of speaker enclosures being adapted to be disposed about said record player and said base to act together as a case therefore when said record player is in its stored position,
said pair of speaker enclosures being separable from said record player to act as the sound reproducing elements of said assembly when said record player is in its playable position separated from said speaker enclosures,
each of said speaker enclosures including a door pivotly mounted at one end thereof so that said door pivots inwardly of the enclosure to provide access to the record player receiving area of said enclosure when said record player and base are inserted into said enclosure,
said doors being biased to close said speaker enclosures so that when said pair of speaker enclosures are removed from about said record player and base said doors close and complete the enclosure for the speakers disposed therein.

2. The assembly of claim 1 wherein:
each of said speaker enclosures including a pair of doors, each of said doors being pivotally mounted to respective sides of said enclosure so that said doors pivot inwardly when said record player and base are inserted into said enclosure.

3. The assembly of claim 2 wherein:
each of said pair of doors is pivotally mounted by a hinge, said hinge being spring biased to close said doors when said speaker enclosures are removed from about said record player.

4. The assembly of claim 3 including:
securing means for securing said base to each of said pair of speaker enclosures so that said record player and said base are securely mounted within said pair of speaker enclosures for carrying said assembly.

5. The assembly of claim 4 wherein:
said securing means comprising a receiving slot member disposed on an inside surface of each of said pair of speaker enclosures, and
a pair of mating slot members disposed on the bottom surface of said base so that one of said pair of mating slot members will engage the respective one of said receiving slot members when said record player and base are disposed in said pair of speaker enclosures.

6. The assembly of claim 5 including:
latching means for securing said pair of speaker enclosures together when said second player and base are disposed therein; and
handle means connected to said assembly for carrying said assembly.

7. The assembly of claim 2 wherein:
a sliding strip being disposed on each of said pair of doors to provide a sliding surface for said record player and base when being inserted and withdrawn from said pair of speaker enclosures.

References Cited

UNITED STATES PATENTS 3,135,837 6/1964 Tateishi -------------- 274—2

LEONARD FORMAN, Primary Examiner

R. A. FIELDS, Assistant Examiner

U.S. Cl. X.R.

312—8